(12) United States Patent
Brenner

(10) Patent No.: US 9,500,105 B2
(45) Date of Patent: Nov. 22, 2016

(54) CAMSHAFT ADJUSTER

(71) Applicant: Schaeffler Technologies AG & Co. KG, Herzogenaurach (DE)

(72) Inventor: Holger Brenner, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/774,596

(22) PCT Filed: Dec. 11, 2013

(86) PCT No.: PCT/DE2013/200350
§ 371 (c)(1),
(2) Date: Sep. 10, 2015

(87) PCT Pub. No.: WO2014/146625
PCT Pub. Date: Sep. 25, 2014

(65) Prior Publication Data
US 2016/0032789 A1    Feb. 4, 2016

(30) Foreign Application Priority Data
Mar. 18, 2013   (DE) .................. 10 2013 204 659

(51) Int. Cl.
*F01L 1/34* (2006.01)
*F01L 1/344* (2006.01)
*F16H 25/10* (2006.01)

(52) U.S. Cl.
CPC ............. *F01L 1/344* (2013.01); *F01L 1/3442* (2013.01); *F16H 25/10* (2013.01)

(58) Field of Classification Search
CPC ........ F01L 1/344; F01L 1/3442; F16H 25/10
USPC ............................. 123/90.15, 90.17; 464/160
See application file for complete search history.

(56) References Cited

U.S. PATENT DOCUMENTS

| 7,765,967 B2* | 8/2010 | Kira ................... F01L 1/022 123/90.15 |
| 2005/0066922 A1 | 3/2005 | Knecht et al. |
| 2009/0017920 A1 | 1/2009 | Fox et al. |
| 2009/0250026 A1 | 10/2009 | Ottersbach et al. |
| 2012/0125275 A1 | 5/2012 | Arnold et al. |
| 2012/0318222 A1 | 12/2012 | Weber |

FOREIGN PATENT DOCUMENTS

| DE | 10 2008 017 688 A1 | 10/2009 |
| DE | 102010009394 | 9/2011 |
| EP | 2014881 | 1/2009 |
| GB | 2421557 | 6/2006 |
| WO | WO03/076771 | 9/2003 |

* cited by examiner

*Primary Examiner* — Ching Chang
(74) *Attorney, Agent, or Firm* — Davidson, Davidson & Kappel, LLC

(57) ABSTRACT

A cam shaft adjuster a drive element and an output element, wherein the drive element and the output element are arranged so as to be rotatable relative to one another and the camshaft adjuster includes a cover element which is fastened non-rotatably to the drive element or to the output element, wherein the drive element or the output element has a through-bore through which a screw passes, wherein the screw engages in a threaded bush, wherein the threaded bush projects both into a through-bore of the cover element and into the through-bore of the drive element or output element.

10 Claims, 2 Drawing Sheets

CAMSHAFT ADJUSTER

The present invention relates to a camshaft adjuster.

BACKGROUND

Camshaft adjusters are used in internal combustion engines to vary the control times of the combustion chamber valves to be able to vary the phase relation between a crankshaft and a camshaft in a defined angle range between a maximum advance position and a maximum retard position. Adjusting the control times to the instantaneous load and rotational speed reduces consumption and emissions. For this purpose, camshaft adjusters are integrated into a drive train via which a torque is transferred from the crankshaft to the camshaft. This drive train may be designed, for example, as a belt, chain or gear drive.

In a hydraulic camshaft adjuster, the output element and the drive element form one or multiple pair(s) of counteracting pressure chambers to which a hydraulic medium is applied. The drive element and the output element are coaxially situated. A relative movement between the drive element and the output element is created by filling and emptying individual pressure chambers. The rotatively acting spring between the drive element and the output element pushes the drive element toward the output element in an advantageous direction. This advantageous direction may be in the same direction or in the opposite direction of the rotation direction.

One design of the hydraulic camshaft adjuster is the vane adjuster. The vane adjuster includes a stator, a rotor and a drive wheel which has an external toothing. The rotor as the output element is usually designed to be rotatably fixedly connectable to the camshaft. The drive element includes the stator and the drive wheel. The stator and the drive wheel are rotatably fixedly connected to each other or, alternatively, they are designed to form a single piece with each other. The rotor is situated coaxially with respect to the stator and inside the stator. Together with their radially extending vanes, the rotor and the stator form oppositely acting oil chambers to which oil pressure may be applied and which facilitate a relative rotation between the stator and the rotor. The vanes are either designed to form a single piece with the rotor or the stator or are situated as "plugged-in vanes" in grooves of the rotor or stator provided for this purpose. The vane adjusters furthermore include various sealing covers. The stator and the sealing covers are secured to each other with the aid of multiple screw connections.

Another design of the hydraulic camshaft adjuster is the axial piston adjuster. In this case, a shifting element, which creates a relative rotation between a drive element and an output element via inclined toothings, is axially shifted with the aid of oil pressure.

A further design of a camshaft adjuster is the electromechanical camshaft adjuster, which has a three-shaft gear set (for example, a planetary gear set). One of the shafts forms the drive element and a second shaft forms the output element. Rotation energy may be supplied to the system or removed from the system via the third shaft with the aid of an actuating device, for example an electric motor or a brake. A spring may be additionally situated, which supports or feeds back the relative rotation between the drive element and the output element.

DE 10 2008 017 688 A1 shows a device for the variable adjustment of control times of gas exchange valves, a side cover designed as a sealing cover including counter-elements for engaging with fastening elements.

SUMMARY OF THE INVENTION

It is an object of the present invention to provide a camshaft adjuster which includes a cover element, the cover element being particularly cost-effectively and reliably fastened to the drive element or the output element.

The present invention provides a camshaft adjuster which includes a drive element and an output element, the drive element and the output element being rotatably situated relative to each other, and the camshaft adjuster including a cover element which is rotatably fixedly connected to the drive element or the output element, the drive element or the output element having a through-opening which is penetrated by a screw, in that the screw engages with a threaded bushing, the threaded bushing projecting into both a through-opening of the cover element and the through-opening of the drive element or the output element.

The drive element may have a receptacle for an output element. The output element is designed to be connectable to a camshaft. The drive element may furthermore have a toothing for a chain, belt or gear drive. The drive element may be formed from multiple components, for example a first component which includes a receptacle for an output element and a second component which is rotatably fixedly connected to the first component and is designed as a drive wheel having the aforementioned toothing.

The cover element is designed as a separate component from the drive element or output element.

A threaded bushing has a cylindrical outer surface and a cylindrical inner surface and an internal thread for the screw. The threaded bushing may be designed to be open on both sides or open on only one side. The cylindrical outer surface and/or the cylindrical inner surface may be designed to be stepped, so that a stop for a peripheral component may be provided in the axial direction. The threaded bushing may furthermore have an outer thread which is oppositely acting from the internal thread, for example an internal thread designed as a right-hand thread and an outer thread designed as a left-hand thread (or vice versa). With the aid of the outer thread, the threaded bushing may be alternatively joined to form a clearance or interference fit with the cover element or the drive element or output element.

The threaded bushing may advantageously be manufactured by a forming method such as deep drawing or extrusion, which may be followed by re-machining methods such as thread cutting or outer diameter grinding.

A vane-type camshaft adjuster includes a drive element and an output element, the drive element and the output element being situated coaxially to the rotation axis of the camshaft adjuster, the drive element and the output element including multiple, radially oriented vanes, the drive element and the output element forming oppositely acting working chambers, each working chamber being defined by a vane pair which includes one vane of the drive element with one vane of the output element, and it being possible to pressurize the working chambers using a hydraulic medium for the purpose of achieving a relative rotation between the drive element and the output element.

The camshaft adjuster may furthermore include a locking mechanism, with the aid of which the drive element may be rotatably fixedly attached and detached to/from the output element.

Due to the threaded bushing according to the present invention, it is achieved that the cover element may be initially fixed to the drive element or the output element and, in a next step, it may be fixedly connected to the screw, which engages with the thread of the threaded bushing with the aid of its thread.

The threaded bushing according to the present invention may be provided multiple times. One through-opening may also be present for each threaded bushing. Ideally, each threaded bushing is in engagement with a screw; alternatively, however, only selected threaded bushings may come into engagement with a screw.

In one variant of the present invention, the threaded bushings are fixedly connected to the cover element with the aid of an integral, form-locked and/or force fit. The cover element is then joined to the drive element or output element, the threaded bushings being inserted into the through-openings of the drive element or output element.

Alternatively, the threaded bushing may be situated on the side of the drive element or the output element facing away from the cover element, and it may completely penetrate the through-opening of the drive element or the output element. In this case, the screw or screws abut(s) the cover element with its/their screw head. For the threaded bushing to retain its axial position during clamping with the aid of the screw/screws, the threaded bushing is provided, for example, with a stop surface which is supported on a step of the stepped through-opening of the drive element or output element. The thread of the threaded bushing is advantageously formed by an area facing away from the cover element, so that a preferably great extension length of the screw is present. The threaded bushing furthermore projects into the through-opening of the cover element.

The screw is subsequently screwed to the threaded bushings, and the cover element is clamped to the drive element or output element.

Another advantage is the fact that threaded bushings which have been adapted to different camshaft adjusters may be used, whereby the screws may be standardized.

In one embodiment of the present invention, the threaded bushing has a collar which abuts the cover element. The cover element may be advantageously adjusted in its position with respect to the drive element or output element, for example to set a locking clearance before the cover element is fixedly clamped to the drive element or the output element in the axial direction with the aid of the screws.

Alternatively, the collar of the threaded bushing may also abut the side of the drive element or output element facing away from the cover element. The threaded bushing completely penetrates the through-opening of the drive element or output element and also partially penetrates the cover element. In this case, the screw or screws abut(s) the cover element with its/their screw head. The thread of the threaded bushing is advantageously provided in the area of the collar, so that a preferably great extension length of the screw is present.

In one advantageous embodiment, the threaded bushing is locked against rotation with respect to the cover element and/or the through-opening of the drive element or the output element. The lock against rotation may be provided with the aid of an interference fit between the threaded bushing and the through-opening of the cover element or with the aid of an interference fit between the threaded bushing and the through-opening of the drive element or output element.

The lock against rotation may be provided with the aid of additional manufacturing methods such as caulking, clinching or the like.

Alternatively or additionally, a form-locked fit or an integral fit may be provided between the threaded bushing and the cover element or the drive element or output element. A "co-rotation" of the threaded bushing is thus advantageously prevented while screwing the screw into the threaded bushing, and a counter holder tool may be omitted during assembly.

The collar of the threaded bushing may have an outer hexagon or the like for the purpose of securing the threaded bushing, so that it does not rotate together with the screw during the screwing operation.

In one particularly preferred embodiment, the threaded bushing is pressed into the through-opening of the cover element. The threaded bushing may furthermore also have a knurling on the outer lateral surface, for example in the axial direction, with the aid of which a captive fastening is ensured in the axial direction by the press-fit, on the one hand, and the threaded bushing is locked against rotation by the axial knurling while it is being screwed with the aid of the screw, on the other hand.

A knurling on the outer lateral surface of the threaded bushing may be designed as a crisscross pattern, as grooves in the circumferential direction, as grooves transverse to the circumferential direction or as grooves oriented obliquely to the circumferential direction.

The knurling is provided at least in the area of the outer lateral surface of the threaded bushing, which is in engagement with the through-opening of the cover element.

Alternatively, a knurling described above may be provided by the through-opening of the cover element.

In one particularly preferred embodiment, the threaded bushing is pressed into the through-opening of the drive element or output element. In addition, the threaded bushing may advantageously have a knurling on the outer lateral surface, for example in the axial direction, with the aid of which a captive fastening is ensured in the axial direction by the press-fit, on the one hand, and the threaded bushing is locked against rotation by the axially oriented knurling while it is being screwed with the aid of the screw, on the other hand.

A knurling on the outer lateral surface of the threaded bushing may be designed as a crisscross pattern, as grooves in the circumferential direction, as grooves transverse to the circumferential direction or as grooves oriented obliquely to the circumferential direction.

The knurling is provided at least in the area of the outer lateral surface of the threaded bushing, which is in engagement with the through-opening of the drive element or output element.

Alternatively, a knurling described above may be provided by the through-opening of the drive element or output element.

In one embodiment of the present invention, a greater clearance is provided between the threaded bushing and the through-opening of the cover element than between the threaded bushing and the through-opening of the drive element or output element. If the threaded bushing is advantageously inserted without clearance into the through-opening of the drive element or output element, the cover element, which is mounted without clearance onto the threaded bushings, may be adjusted relative to the drive element or output element in the circumferential direction and/or in the radial direction before the cover element is clamped tight to the drive element or output element with the aid of the screw/screws. The through-opening of the cover element may have a larger diameter than the diameter of the threaded bushing. The through-opening of the cover element may also be advantageously designed as a long hole in the circumferential direction.

In one embodiment of the present invention, a smaller clearance is provided between the threaded bushing and the through-opening of the cover element than between the threaded bushing and the through element of the drive element or output element. If the threaded bushing is advantageously inserted without clearance into the through-opening of the cover element, the cover element, which is mounted on the drive element or output element, may be adjusted relative to the drive element or output element in the circumferential direction and/or in the radial direction before the cover element is clamped tight to the drive element or output element with the aid of the screw/screws. A greater clearance is provided between the through-opening of the drive element or output element and the threaded bushing than between the threaded bushing and the through-opening of the cover element. The through-opening of the drive element or output element may have a larger diameter than the diameter of the threaded bushing. The through-opening of the drive element or output element may also be advantageously designed as a long hole in the circumferential direction.

In one embodiment, the threaded bushing is designed as a threaded sleeve which is open on both sides. A screw may advantageously project into this threaded bushing from both sides, which simplifies the assembly.

In one advantageous embodiment, the threaded bushing includes a spring suspension, the spring bracing the drive element with the output element. The threaded bushing may preferably project out of the drive element or output element or the cover element to the extent that the spring may be supported on the outer circumference of the threaded bushing.

In another embodiment of the present invention, the threaded bushing is designed as a threaded sleeve which is open on one side, a spring suspension for a spring being provided on the closed side of the one-sidedly open threaded sleeve, the spring bracing the drive element with the output element. A dome which projects out of the front side of the drive element or output element or the cover element may be advantageously provided for suspending a spring.

Due to the arrangement according to the present invention, a simplified assembly of the camshaft adjuster is achieved.

BRIEF DESCRIPTION OF THE DRAWINGS

Exemplary embodiments of the present invention are illustrated in the figures.

DETAILED DESCRIPTION

Figure 1:
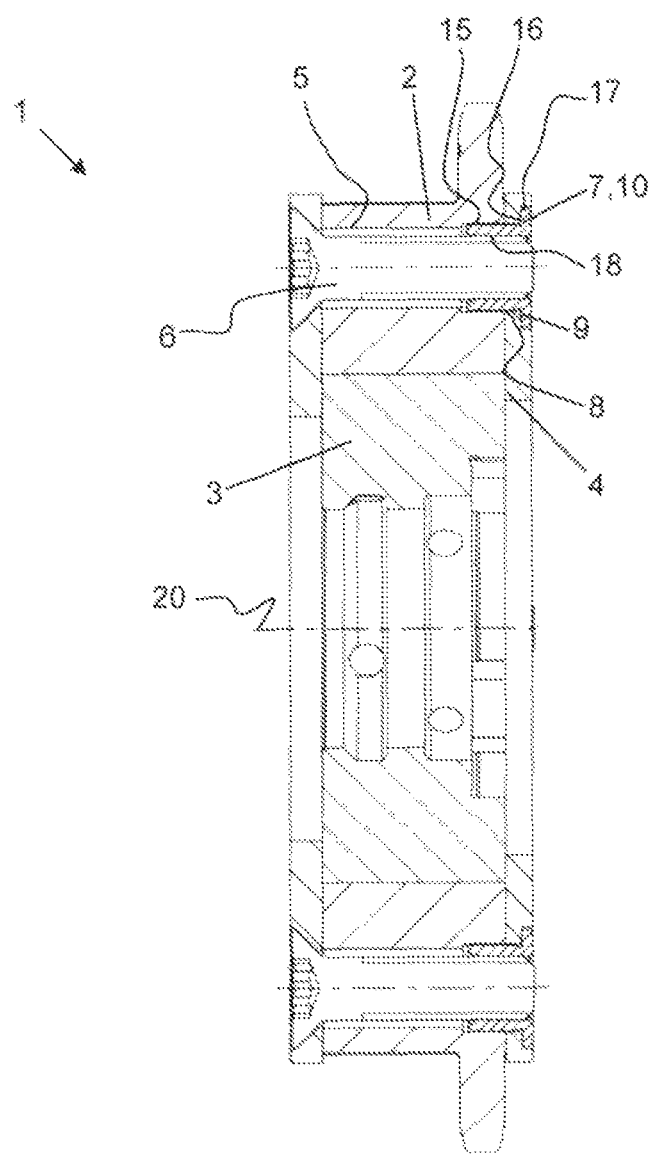
FIG. 1 shows a sectional view of a camshaft adjuster, including a threaded bushing according to the present invention.

FIG. 1 shows a sectional view of a camshaft adjuster 1, including a threaded bushing 7 according to the present invention. Camshaft adjuster 1 includes a drive element 2 and an output element 3. Drive element 2 and output element 3 are situated coaxially to rotation axis 20 of camshaft adjuster 1, drive element 2 and output element 3 including multiple, radially oriented vanes, which are not illustrated in greater detail herein, drive element 2 and output element 3 forming oppositely acting working chambers, each working chamber being defined by a vane pair which includes one vane of drive element 2 with one vane of output element 3, and it being possible to pressurize the working chambers using a hydraulic medium for the purpose of achieving a relative rotation between drive element 2 and output element 3.

Camshaft adjuster 1 furthermore includes a cover element 4, which has a planar and annular design and which is situated on a front side of drive element 2 or output element 3. Cover element 4 is fastened to drive element 2 with the aid of a screw 6. Screw 6 completely penetrates a through-opening 5 of drive element 2, which is designed as a through-bore. Through-opening 5 is situated in a vane of drive element 2, which is not illustrated in greater detail herein.

To fasten cover element 4 with screw 6, a threaded bushing 7 is situated between these two components. Threaded bushing 7 in this case is designed as a threaded sleeve 10 which is open on both sides. Threaded bushing 7 furthermore has a collar 9, which directly terminates with a front side of threaded bushing 7. Screw 6 penetrates through-opening 8, which is formed by cover element 4 and is designed in this case as a through-bore, as well as threaded bushing 7. Screw 6 may alternatively project at least partially into threaded bushing 7, provided that at least two or three thread turns of screw 6 are in engagement with threaded bushing 7.

Cover element 4 is pressed or tightened against drive element 2 with the aid of collar 9. In other words, cover element 4 is clamped between collar 9 and drive element 2 via annular surface 16 of collar 9. Threaded bushing 7 projects partially into through-opening 5 of drive element 2.

A clearance is provided between cylindrical outer circumferential surface 15 of threaded bushing 7 and the cylindrical inner circumferential surface of through-opening 5. A clearance is also provided between cylindrical outer circumferential surface 15 of threaded bushing 7 and the cylindrical inner circumferential surface of through-opening 8. Due to the predefined clearances, cover element 4 may be mounted onto drive element 2 with the aid of threaded bushings 7, an adjustment being possible in both the circumferential direction and the radial direction. The ability to make an adjustment may be used for setting a locking clearance between a locking piston supported in drive element 2 and a locking gate provided by cover element 4. In such a case, cover element 4 is designed as a locking cover.

Through-opening 8 of cover element 4 is designed as a stepped bore, so that collar 9 of threaded bushing 7 is able to be embedded in cover element 4 and does not project beyond the front side of cover element 4.

Threaded bushing 7 or two-sidedly open threaded sleeve 10, is manufactured using a deep-drawing or extrusion method. A possible re-machining of outer circumferential surfaces 15, 17 may be provided. Threaded bushing 7 is completely penetrated by an internal thread 18, which is in engagement with the thread of screw 6. Annular surface 16 may have a structuring, for example in the form of a knurling, which may be provided with the aid of an embossing process.

Additionally or alternatively to the provided structuring of annular surface 16, outer circumferential surface 17 or 15 may also be designed as a polygon or non-circular surface for a lock against rotation, so that it may be in engagement with a complementary inner circumferential surface provided by through-opening 8 or 5 and thereby prevent a rotation of threaded bushing 7 around its own axis.

Alternatively to the metallic material of threaded bushing 7, threaded bushing 7 may also be made of a non-metallic material, such as plastic or the like.

Threaded bushing 7 may also be designed without an internal thread, screw 6 then having to be designed as a thread-cutting screw.

Figure 2:
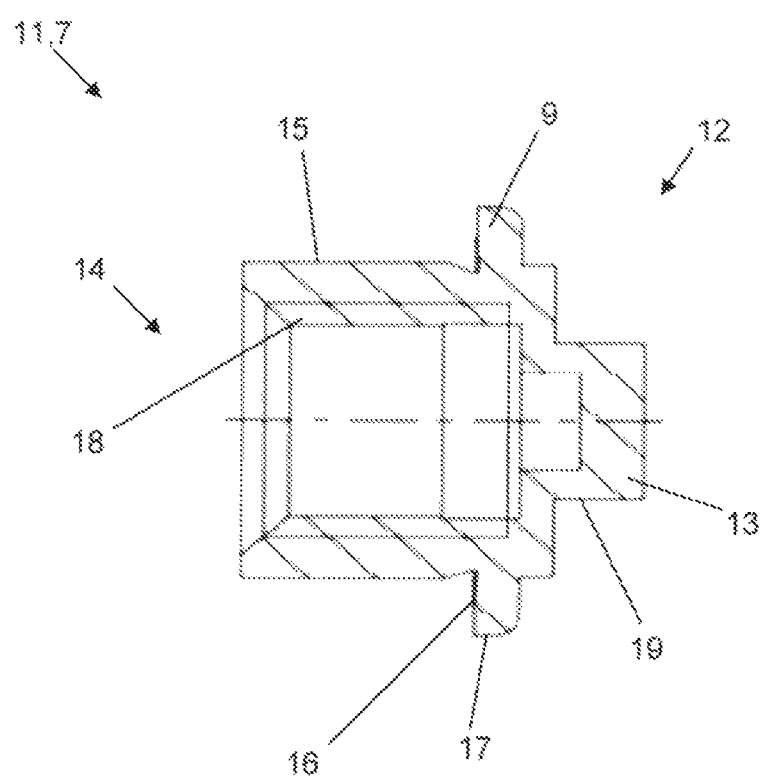
FIG. 2 shows one specific embodiment of the threaded bushing according to the present invention, including a spring suspension.

FIG. 2 shows one specific embodiment of threaded bushing 7 according to the present invention, including a spring suspension 13. The differences from the design of threaded bushing 7 according to FIG. 1 are discussed below.

Threaded bushing 7 is designed as a threaded sleeve 11 which is open on one side. A dome, which is designed as a spring suspension 13, projects in the axial direction from closed end 12. An internal thread 18 extends from open side 14, almost to the base of threaded sleeve 11.

Spring suspension 13 may accommodate a spring on its outer lateral surface. The shape of the outer lateral surface may have a cylindrical or polygonal design. Spring suspension 13 is suitable for gripping an assembly tool to prevent co-rotation with screw 6.

LIST OF REFERENCE NUMERALS 1) camshaft adjuster
2) drive element
3) output element
4) cover element
5) through-opening
6) screw
7) threaded bushing
8) through-opening
9) collar
10) threaded sleeve which is open on both sides
11) threaded sleeve which is open on one side
12) closed end
13) spring suspension
14) open side
15) outer circumferential surface
16) annular surface
17) outer circumferential surface
18) internal thread
19) outer circumferential surface
20) rotation axis

What is claimed is:

1. A camshaft adjuster comprising:
   a drive element;
   an output element, the drive element and the output element being rotatably situated relative to each other; and
   a cover element rotatably fixedly connected to the drive element or the output element, the drive element or the output element having a through-opening penetrated by a screw, the screw engaging with a threaded bushing, the threaded bushing projecting into both a further through-opening of the cover element and the through-opening of the drive element or output element.

2. The camshaft adjuster as recited in claim 1 wherein the threaded bushing has a collar abutting the cover element.

3. The camshaft adjuster as recited in claim 1 wherein the threaded bushing is locked against rotation with respect to the cover element or the through-opening of the drive element or the output element.

4. The camshaft adjuster as recited in claim 3 wherein the threaded bushing is pressed into the further through-opening of the cover element.

5. The camshaft adjuster as recited in claim 3 wherein the threaded bushing is pressed into the through-opening of the drive element or the output element.

6. The camshaft adjuster as recited in claim 1 wherein a greater clearance is provided between the threaded bushing and the further through-opening of the cover element than between the threaded bushing and the through-opening of the drive element or the output element.

7. The camshaft adjuster as recited in claim 1 wherein a smaller clearance is provided between the threaded bushing and the further through-opening of the cover element than between the threaded bushing and the through-opening of the drive element or the output element.

8. The camshaft adjuster as recited in claim 1 wherein the threaded bushing is designed as a threaded sleeve open on both sides.

9. The camshaft adjuster as recited in claim 1 wherein the threaded bushing includes a spring suspension for a spring, the spring bracing the drive element with the output element.

10. The camshaft adjuster as recited in claim 1 wherein the threaded bushing is designed as a threaded sleeve open on one side, a spring suspension for a spring being provided on a closed side of the one-sidedly open threaded sleeve, the spring bracing the drive element with the output element.

* * * * *